Oct. 24, 1967  J. FAUCHERE  3,348,709
CONTROL OF MULTIPLE SERVO-MOTOR ACTUATED MACHINES
Filed Oct. 22, 1965  3 Sheets-Sheet 1
Fig.:1
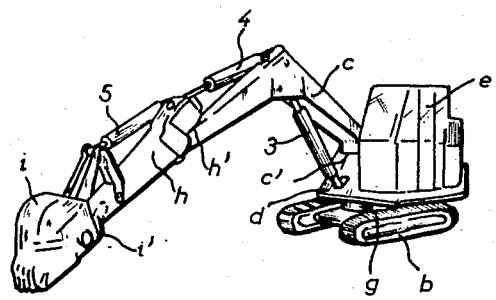
Fig.:3
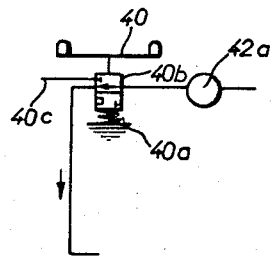
Fig.:4
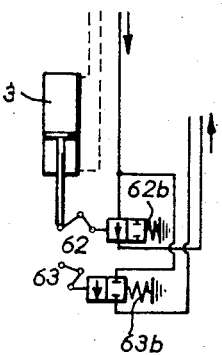
Jean Fauchere,
Inventor

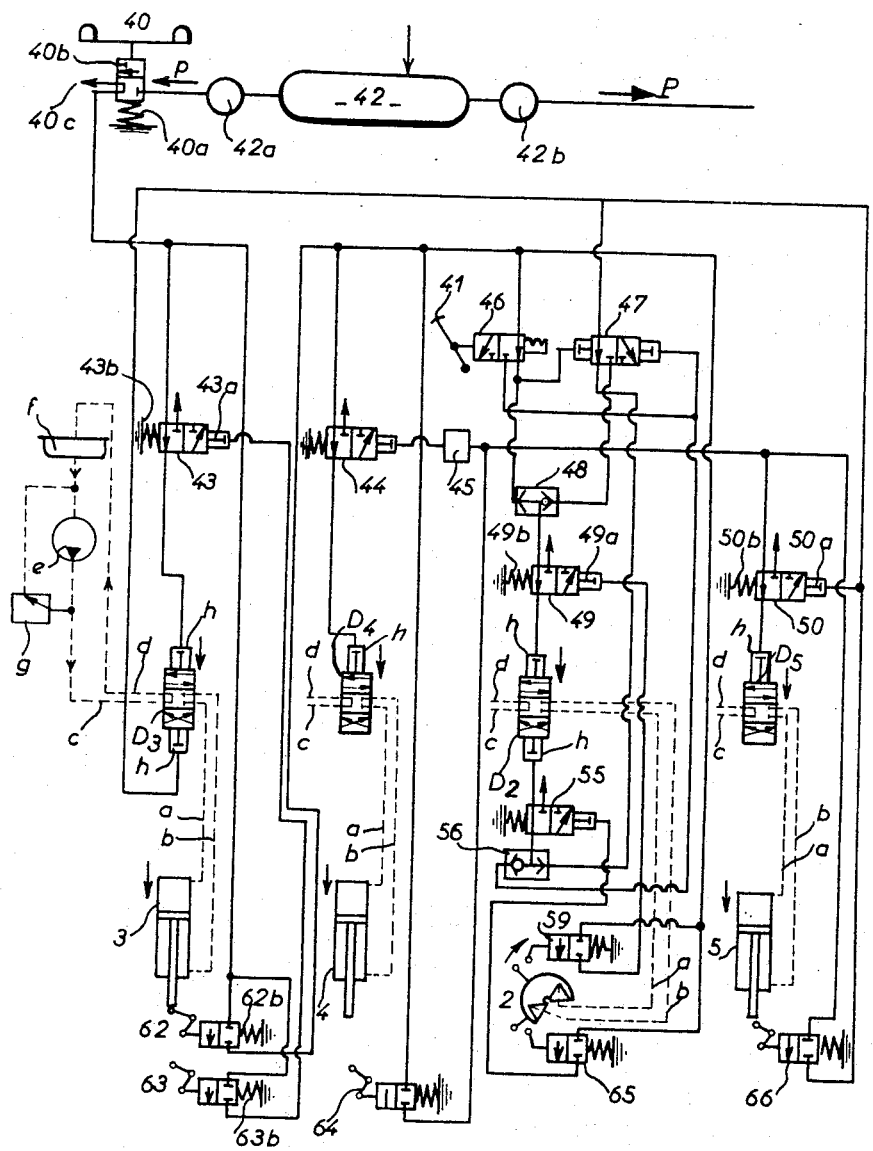

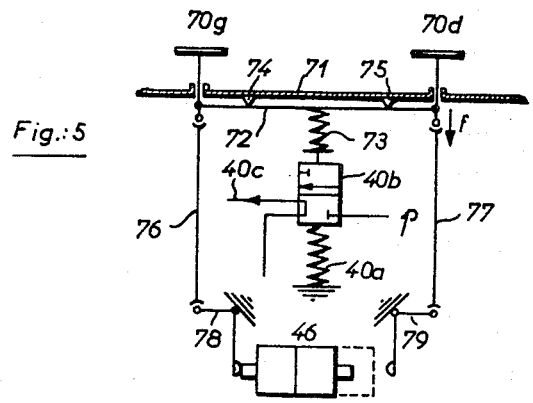
Fig.:5
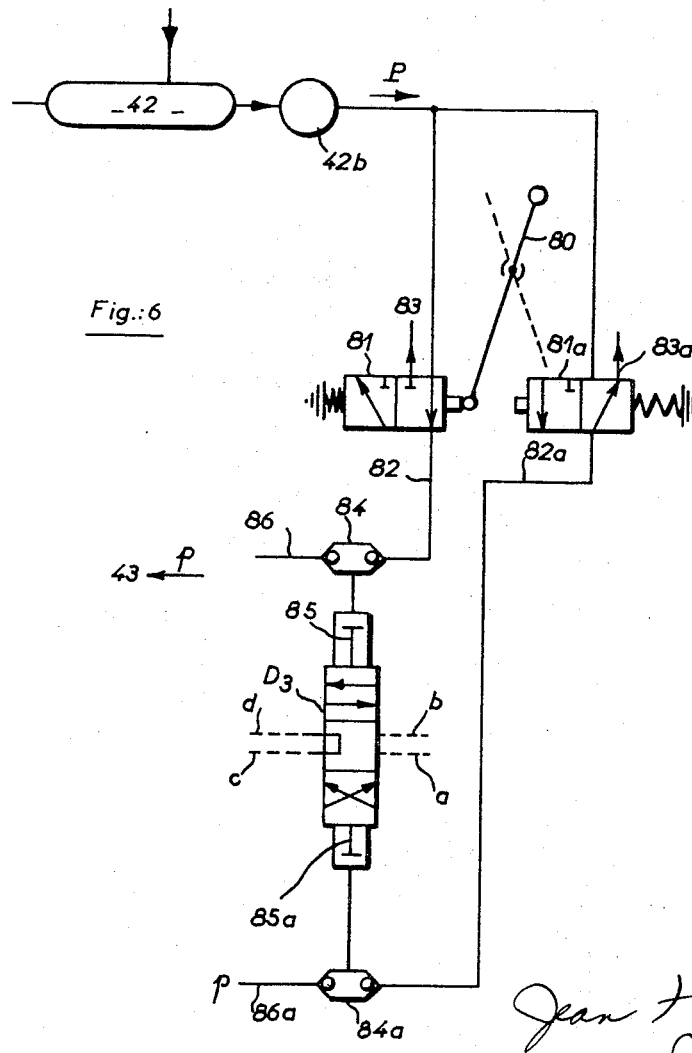
Fig.:6

United States Patent Office 3,348,709
Patented Oct. 24, 1967

3,348,709
CONTROL OF MULTIPLE SERVO-MOTOR
ACTUATED MACHINES
Jean Fauchere, Bourg-la-Reine, France, assignor to Societe
Auxitra, Paris, France, a corporation of France
Filed Oct. 22, 1965, Ser. No. 500,526
Claims priority, application France, Feb. 5, 1965,
4,598
8 Claims. (Cl. 214—138)

ABSTRACT OF THE DISCLOSURE

A device for the control of machines which have a plurality of active members, the movement of which is controlled manually or automatically in a pre-determined order is described. The device comprises in combination, a multiplicity of hydraulic engines or jacks for actuating the active members, distributors for controlling the feed of hydraulic fluid to the engines or jacks, means for controlling the distributors, means for acting manually on said control means, and an auxiliary fluid circuit and switching members connected in the circuit and actuated in the movement of the motors so as to cause the auxiliary fluid to act in a predetermined order on the control means. The manual controls are predominant over the automatic controls and, therefore, the operator can interrupt the sequence of movements of the device at will when the device is on automatic.

Certain known machines for public work comprise various members which require to be actuated independently of each other by engines or by jacks, notably by hydraulic jacks.

In the normal functioning of these machines, the various engines require to be controlled at relatively short intervals of time, in such manner that the person operating the machine is obliged to effect various manipulations extremely rapidly.

The present invention relates to a control device which, by means of an auxiliary control fluid or agent and a combination of relays or switching members, some of which are actuated during the running of the engines, permits the automatic obtaining of the desired succession in the operation of the engines by means of a single manipulation of the operator, the device furthermore comprising a member adapted to interrupt the automatic cycle when the operator wishes to intervene in order to carry out certain manipulations at will.

A particularly interesting application of the present invention relates to the control of hydraulically controlled shovel-dredgers which are required to effect dredging operations with a relatively short working cycle.

The description which follows with reference to the accompanying drawings which are given purely by way of non-limitative example, will show clearly how the invention may be carried into effect, it being understood that the special features disclosed both in the text and the figures form a part of the said invention.

FIGURE 1 is a diagrammatic, perspective view of an hydraulic shovel-dredger to which the invention may be applied with advantage.

FIGURE 2 is a diagram of a mode of embodiment of a control device according to the invention, wherein the auxiliary agent is a gas under pressure.

FIGURES 3 and 4 are detail views in different functioning positions.

FIGURE 5 shows, diagrammatically, a mechanical embodiment of the automatic control member at the disposal of the operator.

FIGURE 6 shows, diagramatically, the manner in which preponderance of the manual controls relatively to automatic control may be provided.

The shovel-dredger of well-known type, shown in FIGURE 1, comprises, on a caterpillar vehicle $b$:

A jib $c$ articulated at $c'$ on a frame $d$ which is free to pivot about a vertical pivot $g$ on the chassis $b$ of the vehicle, so as to modify the orientation of the mechanism during work;

An arm $h$ articulated at $h'$ to the end of the jib;

An excavator bucket $i$ of the retro-movement type, articulated at $i'$ to the arm $h$.

The driving agent determining the movement of these members is generally an hydraulic pressure operating in jacks, i.e. a jack 3 for the jib, a jack 4 for the arm, 5 for the bucket and 2 (rotary jack) for orientation of the jib about the vertical pivot $g$. These jacks are fed with pressure liquid by distributors which the operator conventionally manipulates manually with the aid of levers. Assuming that the bucket is already completely filled at the end of the excavating action, the operator will carry out the following manipulations in order:

(1) He will raise the jib $c$,
(2) He will pivot the frame $d$ with the remainder of the mechanism from left to right,
(3) He will raise the arm $h$,
(4) He will halt the ascent of the jib,
(5) He will halt the movement of orientation of the mechanism,
(6) He will rock the bucket $i$ in order to empty it,
(7) He will stop the ascending movement of the arm,
(8) He will stop the rocking of the bucket,
(9) He will return to the initial orientation of the mechanism,
(10) He will lower the jib,
(11) He will stop the movement of orientation of the mechanism,
(12) He will stop the descent of the jib.
(13) He will carry out an excavating operation in order to fill the bucket, doing so by means of a succession of manipulations of the arm and of the bucket, which said manipulations are variable as a function of the ground and of the habits of the operator.

It is useful that these various manipulations should follow each other within an extremely short period of time and it is possible to provide, on an average, in an ideal theoretic cycle, one manipulation per second, with a maximum of approximately 3 manipulations per second on the control levers.

This rate exceeds what may be expected of human strength in continuous operation and the average hourly working cycle is considerably longer.

The automatic and programmed control device forming the subject of the invention affords considerable relief to the operator and permits the achievement the minimum duration of the cycle whilst allowing the intervention of the operator when and if he finds it necessary to affect manipulations deviating from the conventional cycle.

A description will now be given, with reference to FIGURES 2 to 4, of a special embodiment of a control device of this kind, it being clearly understood that this mode of embodiment is not limitative.

In this mode of embodiment, the driving agent for the jacks is an hydraulic pressure fluid, whereas the auxiliary agent for automatic control is compressed air.

Each of the jacks 2, 3, 4 and 5 is fed with hydraulic pressure fluid through intermediary of a distributor, i.e. distributor D2 for the rotary motor 2 for orientation of the jib, distributor D3 for the jack 3 which provides for the inclination of the jib, distributor D4 for the jack 4 actuating the arm $h$ articulated to the jib, and distributor D5 for the jack 5 actuating the bucket. These distributors are shown in the accompanying FIGURE 2 by means of the mode of representation conventionally used in conventionally used in connection with hydraulic controls.

In FIGURE 2, there are shown in broken lines the parts of the hydraulic circuit connecting each distributor to its associated jack and also to the source of pressure oil and, in full lines, the auxiliary pneumatic circuit associated with the control device forming the subject of the invention. It will thus be seen that each distributor is connected on the one side to two conduits $a$, $b$ opening out respectively at the two ends of the corresponding hydraulic engine shown in the form of a double-action jack. Each distributor is also connected to two further conduits $c$, $d$, the first of which is connected to the delivery of an oil pump $e$ whereas the second is the conduit for return of the oil to the reservoir $f$. A limiting means $g$ for the delivery pressure of the pump has also been shown diagrammatically. Also shown diagrammatically are pistons $h$ for controlling the movement of the distributors (the said pistons also being designated by the reference numerals 85 and 85a in FIGURE 6) by the auxiliary pneumatic circuit.

In addition to manual controls which permit the operator to act at will on the various distributors, the latter has a double-action pedal 40 which is recalled by a spring 40a into its inoperative position (as shown), wherein a pneumatic valve 40b, the moving part of which is connected to the pedal, connects the pneumatic control circuit to exhaust via 40c, so that the manipulations can then only be effected manually. The operator is required to depress the said pedal, when he wishes to initiate the automatic cycle. The pedal then adopts the position shown in FIGURE 3, wherein the operator is required to maintain it during the entire duration of the automatic cycle. If he releases it, the spring 40a thereof returns it into the position shown in FIGURE 2, wherein it stops the cycle. This pedal is associated with a lever 41 having two positions which, by acting on the moving part of a valve 46, determines the orientation of the jib towards the right or towards the left, at the choice of the operator.

The assembly of the pneumatic control device is fed with compressed air from a reservoir 42, through intermediary of an expansion means 42a which is adjusted to supply a pressure $p$ which is less than the pressure P supplied by a second expansion means 42b and serving for displacing the moving parts of the control members, notably those of the distributors D1, D2 . . . D5, under the action of the manual controls. In this way, the said manual controls always predominate relatively to the automatic controls, taken as a whole or separately.

In order to describe the functioning of the automatic cycle, it will be assumed that at the commencement of the said cycle the bucket is at the end of excavation position, wherein it has been completely loaded by excavating manipulations manually controlled by the operator of the shovel. It will be assumed, furthermore, that the pedal 40 and the lever 41 are in the "rotation to the right" position.

Under these conditions, when pressure is exerted on the pedal 40, the said pedal disposes the moving part of the valve 40b in the position shown in FIGURE 3, wherein the exhaust 40c is closed, whereas the pneumatic circuit is connected to the outlet of the expansion means 42a.

The compressed air reaches the distributor valves 43, 62 and 63.

The valve 43 feeds with compressed air the upper control chamber of the distributor D3.

It should be noted that this expression "upper chamber" is here simply intended to supply (for reasons of clarity) a reference to the orientation of the apparatus as shown in the accompanying drawings.

The moving part of the distributor D3 is thus displaced downwardly in the drawing and, in accordance with the indications given in French Patent No. 1,408,913, the jib jack 3 is fed with hydraulic pressure fluid in such manner as to raise the jib. When the said jack 3 has effected a certain stroke, it brings about, by means of a control shown diagrammatically in the form of a pivoting lever, the opening of the valve 62 (see FIGURE 4) against the action of the recall spring 62b thereof and this valve supplies compressed air $p$ to the distributor valves 44, 64, 49 65 and 59. When the jack 3 arrives at the end of travel, it opens the valve 63 against the action of its recall spring 63b. This valve 63 supplies air to a control piston 43a for the valve 43 and thus brings about the closure of the said valve against the action of its recall spring 43b. At this instant, the upper control chamber of the distributor D3 is no longer fed and is, on the contrary, connected to exhaust via the valve 43, in such manner that the moving part of this distributor, which is provided with an automatic recall means, returns to the dead centre (position shown in FIGURE 2 of French Patent No. 1,408,913) and the movement of the jib is halted.

The valve 44 feeds with compressed air the lower control chamber of the distributor D4, so that the jack 4 receives the hydraulic pressure fluid and brings about the lifting of the arm $h$. At the end of a certain travel, the jack 4 opens the valve 64 and the latter supplies compressed air to the distributor valves 50 and 66 and also to a temporiser valve 45 which stops the raising of the arm at the end of a pre-determined time, supplying the air to the control piston of the valve 44.

The valve 49 supplies the air to the upper control chamber of the distributor D2 which feeds the engine 2 with hydraulic fluid, in such manner as to bring about the rotation of the mechanism in the clockwise direction. At the end of its rotation, the driving part of the motor 2 opens the valve 59, in such manner that the air acts on the control piston 49a of the valve 49 and closes the said valve, against the action of its recall spring 49b, at the same time cancelling the control force on the distributor D2 which returns into the inoperative state, with consequent stopping of the engine 2.

The valve 50 feeds the lower control chamber of the distributor D5 in such manner that the jack 5 of the bucket which is fed with hydraulic fluid brings about the raising of the bucket, in order that the latter may be emptied. During its travel, the jack 5 opens the valve 66, which feeds the valve 55 with compressed air through the agency of the valve 47 and also feeds the selector of the circuit 56 with compressed air. On the other hand, the valve 66 admits the air to the lower control chamber of the distributor D3 which feeds the jack 3 for the descent of the jib. Furthermore, the air is supplied via the valve 66 acts on the control piston 50a of the valve 50, which is thus closed, against the action of its recall spring 50b, halting the control of the distributor D5 and the action of the bucket.

The valve 55 supplies compressed air to the lower control chamber of the distributor D2 which brings about the return rotation of the hydraulic engine 2 and of the mechanism.

Due to the action of the distributor D3, the jib returns into its initial position (lower position in immediate proximity of the ground). The operator then releases the pedal 40, in such manner that the automatic cycle is halted. Everything is then ready for the excavating operation or the operation for filling the bucket by manual control and then for a renewed automatic cycle. It is clear that the mode of embodiment described is capable of numerous variants.

In particular, it will be noted that the valves 43–44— or 62, 44—play the part of a relay for the propagation of the auxiliary control fluid towards the members to be successively actuated, some of the said relays being actuated by the auxiliary fluid itself and others by the movement of the controlled members. In a control device according to the invention wherein use is made of electricity, it will be an easy matter to replace the pneumatic relays described by electrical relays. It would also be possible to form the device by means of combinations of circuits of different character, some of them being pneumatic or hydraulic and the others electrical.

It was stated hereinabove that the pedal 40 serving for the control of the automatic cycle is associated with the lever 41 having two positions which, when action is exerted on the valve 46, determine the movement of the jib towards the right or towards the left at the choice of the operator.

FIGURE 5 shows a mechanical embodiment of a combination of this kind.

In this mode of embodiment, the pedal consists of two independent "knobs" 70g and 70d which project from the floor 71 of the operator's cabin, the operator being required to depress with his foot the one or other of the said knobs, depending on whether he wishes to produce, during the cycle, the rotation to the left or to the right of the jib. The stems of these two knobs, which are guided in orifices in the floor, are interconnected by a lever 72 which is articulated to each one of the said stems and which is maintained, in the inoperative state, by a spring 73 against two abutments 74, 75 having the form of blades and secured under the floor. The spring 73 is interposed between the lever 72 and the moving part of valve 40b which is furthermore provided with its recall spring 40a, in such manner that, in the inoperative state, equilibrium between two springs locates the said moving part in the position described relatively to FIG. 2, wherein the automatic control circuit is connected to exhaust via 40c. At their lower portion, the stems of the knobs 70g, 70d bear on the ends of two connecting rods 76 and 77 which are articulated to cranked levers 78 and 79 respectively, adapted to act on the moving part of the valve 46.

It will be clear that, if the operator depresses for example the knob 70d, the lever 72 will be spaced away from the abutment 75, whilst remaining maintained on the button 74 by the spring 73, so that it will rotate about 74 in the direction of the arrow f. It therefore acts simultaneously, on the one hand via the spring 73 on the moving part of the valve 40b, so as to trip the automatic control cycle as described relatively to FIGURE 1 and, on the other hand, via the connecting rod 77, on the cranked lever 79. The latter places the valve 46 in the position shown in full lines in FIGURE 5, in such manner that the jib of the shovel-dredger rotates to the right. This movement is assisted by the fact that the left-hand end of the lever 72 has ascended slightly at the same time as the knob 70g the stem of which no longer bears on the connecting rod 76. Conversely, if the operator exerts pressure on the knob 70g, the lever 72 pivots about the abutment 75 and the connecting rod 76 places the moving part of the valve 46 in the position shown in dotted lines, so as to bring about the rotation of the jib towards the left.

It has also been shown, relatively to FIGURE 2, that the manual controls preponderate over the automatic control, due to the expansion means 42b which supplies a pressure P which is higher than the pressure p of the expansion means 42 feeding the automatic control circuit. This preponderance may be provided by means of a device similar to the one shown in FIGURE 6 wherein only the distributor D3 is shown, the diagram being analogous with respect to the other members provided with a manual control arrangement. The manual control of the said distributor D3 is effected by means of a lever 80 having three positions, i.e. the position shown in full lines wherein the moving part of the distributor D3 is driven in one direction, the position shown in dotted lines wherein the said distributor is driven in the other direction, and an intermediate position wherein the automatic control is allowed to become operative.

In the position shown in full lines, the lever places in the position illustrated the moving part of a valve 81. The said valve then admits the air compressed to the pressure P into a conduit 82 which, previously, was connected to exhaust via 83. By means of the circuit selector having two opposed valves 84, the air compressed at pressure P is admitted on to the control piston 85 of the distributor D3, whereas the conduit 86, which forms a part of the automatic circuit fed with the lower pressure P, remains closed. The distributor D3 thus obeys the manual controls, even if the opposite piston 85a is subjected to the pressure P of the automatic controls.

If the lever 80 is placed in the position shown in dotted lines, it acts on the valve 81a so as to put it in a position which is symmetrical with respect to that shown in full lines relatively to the valve 81, and thus to feed with pressure P the control piston 85a of the distributor D3. The members corresponding to those described hereinabove have been given the same reference numerals with addition of the index a.

Various changes may be made in the details of the described arrangement without departing from the spirit and scope of the invention as defined by the appended claims.

I claim:

1. A device for the control of machines having a plurality of active members actuated by hydraulic means and the movements of which is to be controlled independently at will or, alternatively, to follow each other automatically in a pre-determined sequence, comprising in combination, a plurality of hydraulic means and distributor means, a main hydraulic circuit feeding said hydraulic means with hydraulic fluid through said distributor means associated therewith, at least one distributor means being associated with each hydraulic means, control members associated with said distributor means for the control thereof, said control members being controlled selectively either independently by first manually operable means associated to each control member or automatically and in a pre-determined sequence through an auxiliary circuit comprising second manually operable means having two positions corresponding respectively to the putting in or out of action of said auxiliary circuit, said second means causing further the feeding with hydraulic fluid of the first hydraulic means of the sequence, and switching members for controlling said control members and, therefore, the distributor means, at least one switching member cooperating with each of said hydraulic means and being actuated upon operation thereof so as to stop and to provide respectively the feeding with hydraulic fluid of the hydraulic means associated therewith and of the subsequent hydraulic means in the sequence.

2. A device according to claim 1 wherein the auxiliary circuit is a first pneumatic circuit and wherein the first manually operable means are valves controlling the control members through a second pneumatic circuit, the control force exerted by this latter circuit on the control members being higher than that exerted by the auxiliary circuit whereby the preponderance of the manual control on the automatic one is provided.

3. A device according to claim 2 wherein said first and second pneumatic circuits are supplied by a source providing gas under two different pressures, the low and high pressure sides of the said source being respectively connected to said first and second pneumatic circuit.

4. A device according to claim 1 wherein at least one engine or jack is fed through a distributor controlled by two control members permitting the actuation of said distributor in two opposite directions, said device comprising further a manually operable selecting member having two positions for permitting to put selectively into operation the one or other of said control members and, therefore, to select the sense of movement of said hydraulic means.

5. A shovel-dredger having a frame pivotally mounted on a vehicle, a jib articulated on said frame, an arm articulated to the end of said jib, a bucket articulated on said arm, hydraulic jacks for actuating said frame, jib, arm and bucket, and a device for controlling the movements of said jacks either at will and independently or automatically and in a pre-determined sequence, said device comprising in combination, a plurality of hydraulic jacks and distributors, a main hydraulic circuit feeding said jacks with hydraulic fluid through said distributors associated therewith, at least one distributor being associated with each jack, control members associated to said distributors for controlling them, said control members being controlled selectively either independently by first manually operable means associated to each control member or automatically and in a pre-determined sequence through an auxiliary circuit comprising second manually operable means having two positions corresponding respectively to the putting in or out of action of said auxiliary circuit, said second means causing further the feeding with hydraulic fluid of the first jack of the sequence, and switching members for controlling said control members and, therefore, the distributors, at least one switching member cooperating with each jack and being actuated upon operation thereof so as to stop and to provide respectively the feeding with hydraulic fluid of the jack associated therewith and of the subsequent jack in the sequence.

6. A shovel-dredger according to claim 5 wherein the auxiliary circuit is a first pneumatic circuit and wherein the first manually operable means are valves controlling the control members through a second pneumatic circuit, the control force exerted by this latter circuit on the control members being higher than that exerted by the auxiliary circuit whereby the preponderance of the manual control on the automatic one is provided.

7. A shovel-dredger according to claim 6 wherein said first and second pneumatic circuits are supplied by a source providing gas under two different pressures, the low and high pressure sides of the said source being respectively connected to said first and second pneumatic circuits.

8. A shovel-dredger according to claim 5 wherein at least one jack is fed through a distributor controlled by two control members permitting the actuation of said distributor in two opposite directions, said device comprising further a manually operable selecting member having two positions for permitting to put selectively into operation the one or other of said control members and, therefore, to select the sense of movement of said jack.

References Cited

UNITED STATES PATENTS

| | | | |
|---|---|---|---|
| 2,883,077 | 4/1959 | Pilch | 214—763 |
| 3,198,360 | 8/1965 | Strader et al. | 214—764 |

FOREIGN PATENTS 1,068,273  2/1954  France.

HUGO O. SCHULZ, *Primary Examiner.*